(No Model.)  2 Sheets—Sheet 1.

A. G. BOLLING.
FISH AND GAME TRAP.

No. 475,845.  Patented May 31, 1892.

Witnesses:
C. H. Mauder
Thomas E. Turpin

Inventor
A. G. Bolling.
By James J. Sheehy
Attorney (No Model.) 2 Sheets—Sheet 2.
A. G. BOLLING.
FISH AND GAME TRAP.
No. 475,845. Patented May 31, 1892.
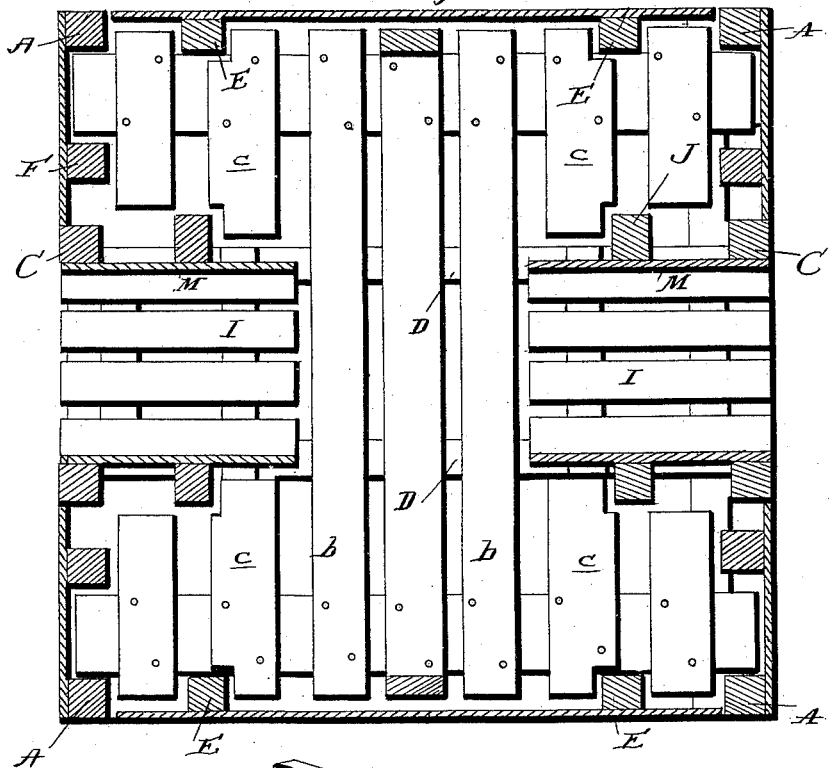
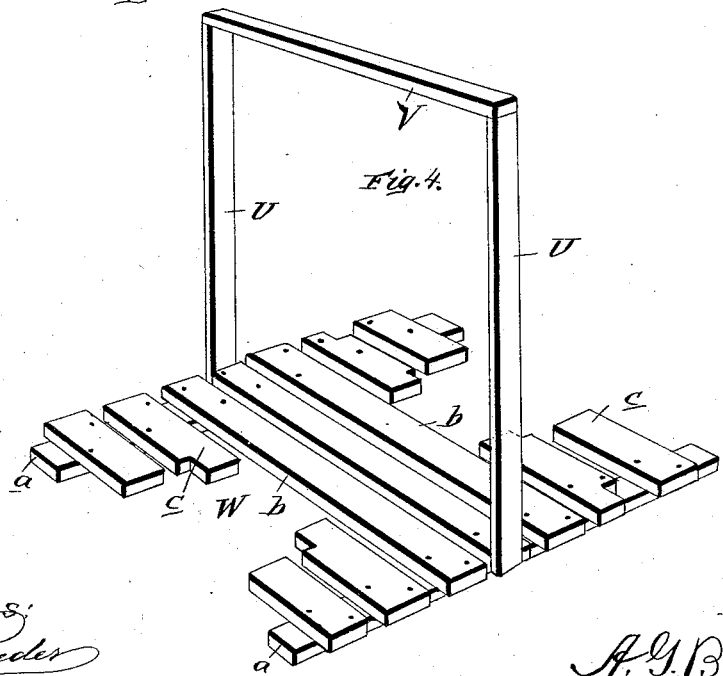

UNITED STATES PATENT OFFICE.

ALLEN G. BOLLING, OF DENISON, TEXAS.

FISH AND GAME TRAP.

SPECIFICATION forming part of Letters Patent No. 475,845, dated May 31, 1892.

Application filed December 9, 1890. Serial No. 374,111. (No model.)

*To all whom it may concern:*

Be it known that I, ALLEN G. BOLLING, a citizen of the United States, residing at Denison, in the county of Grayson and State of Texas, have invented certain new and useful Improvements in Traps; and I do declare the following to be a full, clear, and exact description of the invention, such as will enable others skilled in the art to which it appertains to make and use the same.

My invention has relation to improvements in fish and game traps; and its novelty will be fully understood from the following description and claim when taken in conjunction with the accompanying drawings, in which—

Figure 1:
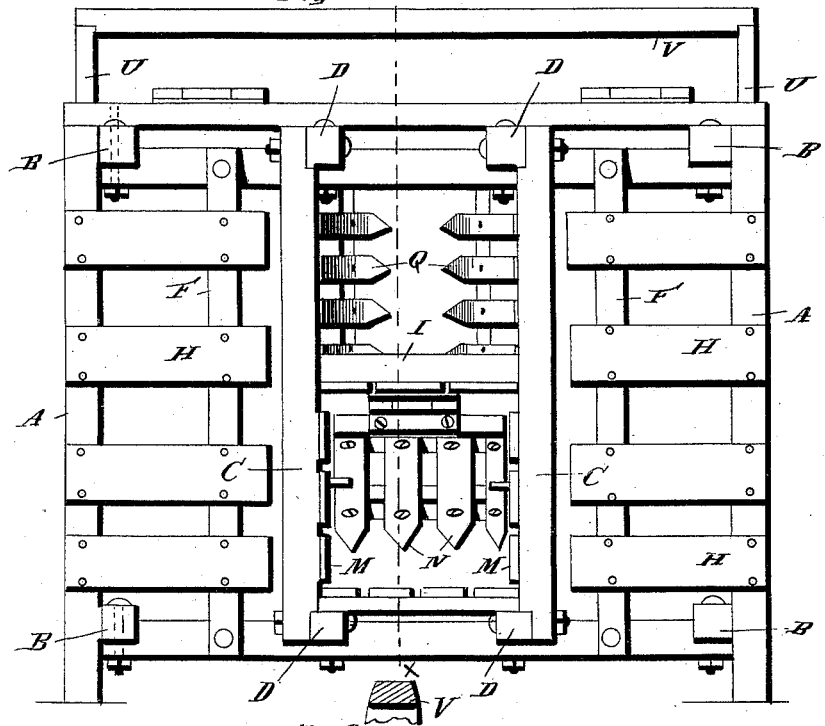
Figure 2:
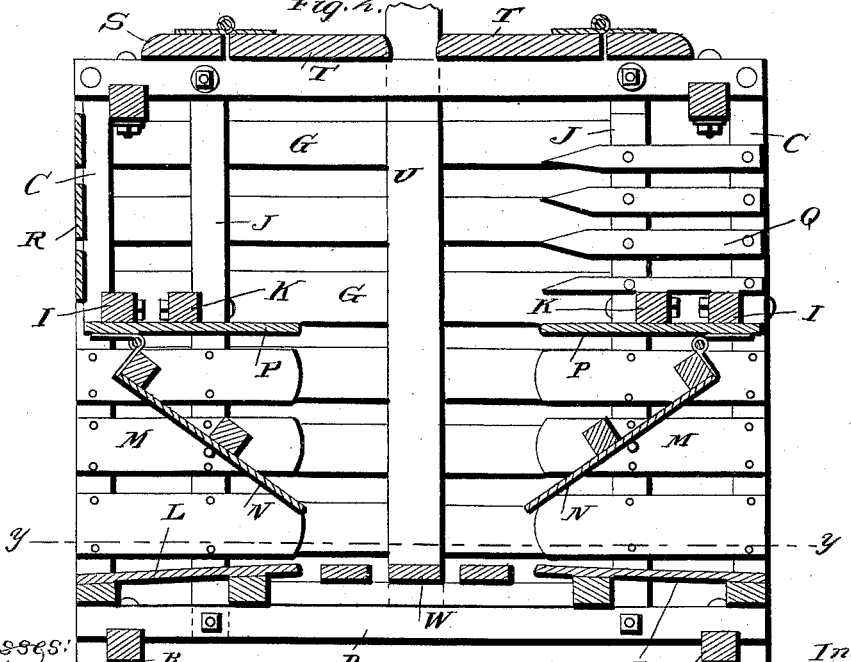

Figure 1 is a front elevation of my improved trap. Fig. 2 is a vertical section of the same, taken in the plane indicated by the line $x$ $x$ on Fig. 1. Fig. 3 is a horizontal section taken in the plane indicated by the line $y$ $y$ on Fig. 2, and Fig. 4 is a perspective view of the movable platform for raising the trapped fish or game to the top of the trap to facilitate their removal.

In the said drawings similar letters designate corresponding parts throughout the several views, referring to which—

A indicates the corner uprights or posts of the rectangular frame, which are connected together adjacent their lower and upper ends by horizontal beams B, which are connected to the respective uprights by bolts or other approved devices.

C indicates parallel uprights, which are connected to the upper and lower beams B on the front and rear sides of the frame and are arranged a suitable distance apart to enable them to serve as casings for the entrances into the trap.

D indicates forwardly and rearwardly extending horizontal beams, which serve to connect the respective forward and rear parallel uprights, to which they are preferably connected by bolts, and these beams D are also preferably connected by bolts to the transverse beams B, as illustrated.

E indicates auxiliary bracing uprights, which are connected by bolts at their upper and lower ends to the forwardly and rearwardly extending beams B between the corner posts or uprights A.

F indicates auxiliary uprights, which are arranged parallel with and adjacent the uprights C and are connected by bolts or the like to the upper and lower transverse beams B.

G indicates the horizontal side slats of the frame, which are suitably connected to the auxiliary uprights E and extend almost to the corner posts A, as illustrated.

H indicates the short horizontal front slats, which are connected to the corner-posts A and the auxiliary uprights F and extend almost to the casing-uprights C.

I indicates a short horizontal beam, which serves to divide the front opening into an upper and lower entrance and is connected at its ends to the casing-uprights C, as better illustrated in Fig. 1.

J indicates auxiliary uprights, which are arranged in line with the upright C and are connected by bolts to the beams D, as shown.

K indicates a short transverse beam, which is arranged parallel to the beam I and is connected at its ends to the beams J, as illustrated.

L indicates the bottom slats of the lower front entrance, which are preferably sharpened at their inner end, and M indicate the side slats thereof.

N indicates the swinging door of the lower front entrance, which is pivotally connected at one end to the top of the entrance and is composed of slats, as illustrated, which are sharpened at their end for obvious purposes.

The top of the lower front entrance is composed of slats P, laid edge to edge, which slats are also sharpened at their inner edges to discourage the fish or game from attempting to escape.

The upper front entrance is composed of two inwardly-converging walls made up of slats Q, which are sharpened at their inner ends, as shown.

In the rear side of the casing I provide an entrance between the lower portion of the uprights C, which entrance is of a construction similar to the lower front entrance and is likewise provided with a pivotally-hung door.

R indicates transverse slats, which serve to close the upper portion of the opening between the rear uprights C.

Although I have described my improved trap as having two front entrances and a single rear entrance, yet I do not desire to confine myself to such construction, as the number and arrangement of entrances may be varied, if desired.

S indicates transverse strips, which are connected to the forward and rearwardly extending beams B and D adjacent the front and rear sides of the trap.

Connected by hinges or the like to the inner edges of the transverse strips S are doors T, which have their inner corners recessed to permit of the passage of the upright branches U, which are connected at their lower ends to the vertically-movable floor and are connected at their upper ends by a cross V, whereby the floor of the trap may be readily raised to the top thereof for the removal of the trapped fish or game.

The bottom W comprises the side strips $a$, to which the branches U of the handle are connected, the transverse strips $b$, which serve to connect the side strips, and the short strips $c$, which are connected to and extend inwardly from the side strips and straddle the respective entrances. The bottom W normally rests upon the forward and rearwardly extending beams B, and by means of the handle it will be readily seen that the bottom may be raised to the top of the frame, when by opening the doors T the trapped fish or game may be removed.

When the trap is employed as a fish-trap, I prefer to so weight the swinging doors of the entrances that the water will not raise them to a horizontal position, and when the trap is so employed it is obvious that it may be anchored or fastened in any approved manner.

Although I have specifically described the construction and management of the several elements making up my trap, I do not desire to be confined to the same, as it is obvious that such changes or modifications may be made as fairly fall within the scope of my invention.

Having described my invention, what I claim, and desire to secure by Letters Patent, is—

The improved fish and game trap described, consisting, essentially, of the rectangular frame composed of slats and bars and having the two lower oppositely-arranged entrances formed from slats, with their inner ends pointed, and also having the hinged or pivoted doors N formed from slats and arranged so as to fall on an incline within said entrances, the upper entrance having it side walls formed from slats and converging inwardly, the hinged tops T T and the vertically-movable slatted bottom W, formed as shown, so as to surround the respective entrances on their inner sides and composed of the parallel bars $a\ a$, the long center slats $b$, and the cut-out slats $c$, and the uprights U U, connected at their lower ends to the bars $a$ and connected at their upper ends by a cross-bar, all arranged to operate substantially as and for the purpose specified.

In testimony whereof I affix my signature in presence of two witnesses.

A. G. BOLLING.

Attest:
 E. J. SMITH,
 A. P. WOOD.